July 14, 1925.
H. TUREK
1,545,865
APPARATUS FOR UNLOADING CARS
Filed Aug. 11, 1923
4 Sheets-Sheet 1
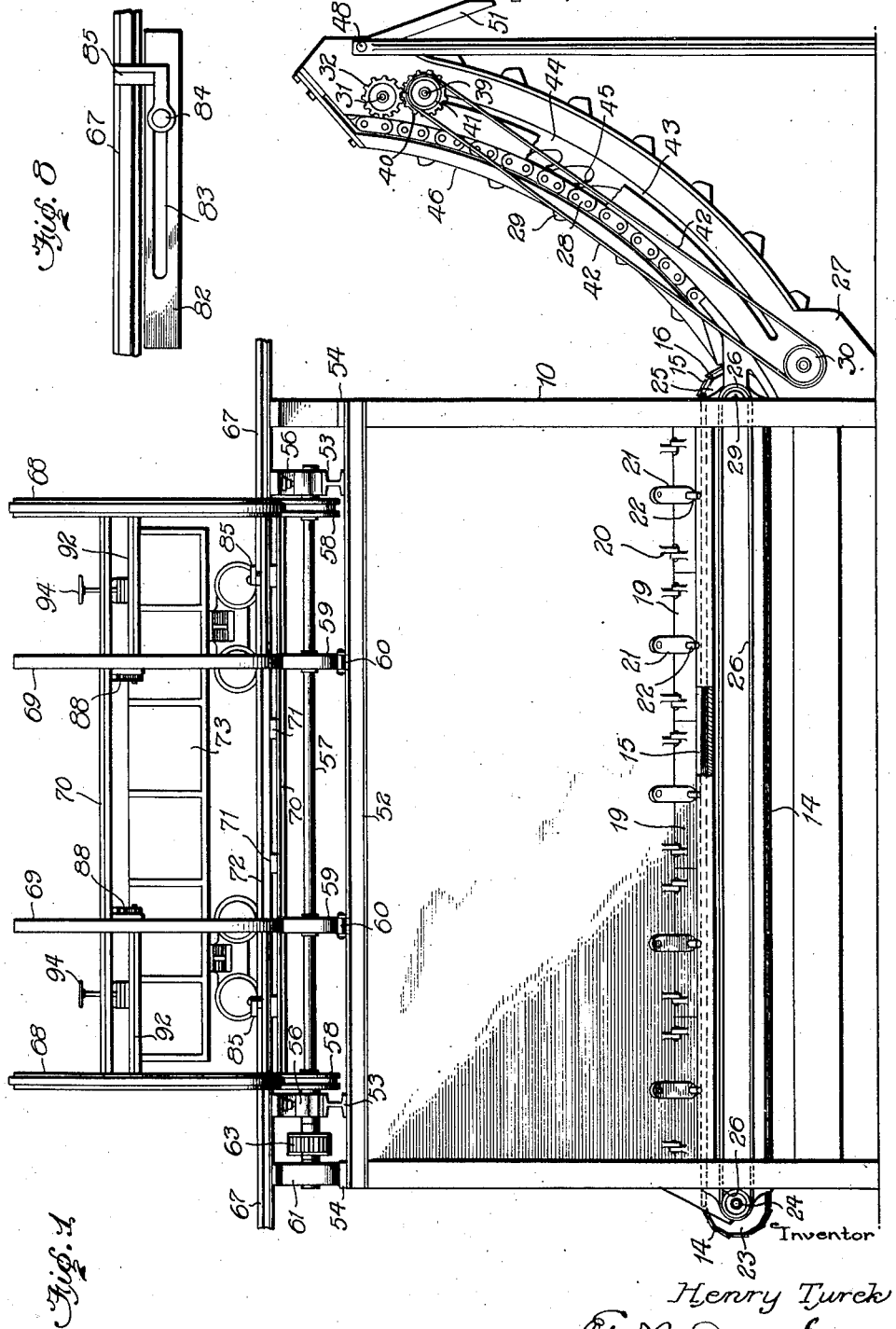
Inventor
Henry Turek
By
Attorney July 14, 1925.  1,545,865
H. TUREK
APPARATUS FOR UNLOADING CARS
Filed Aug. 11, 1923   4 Sheets-Sheet 2
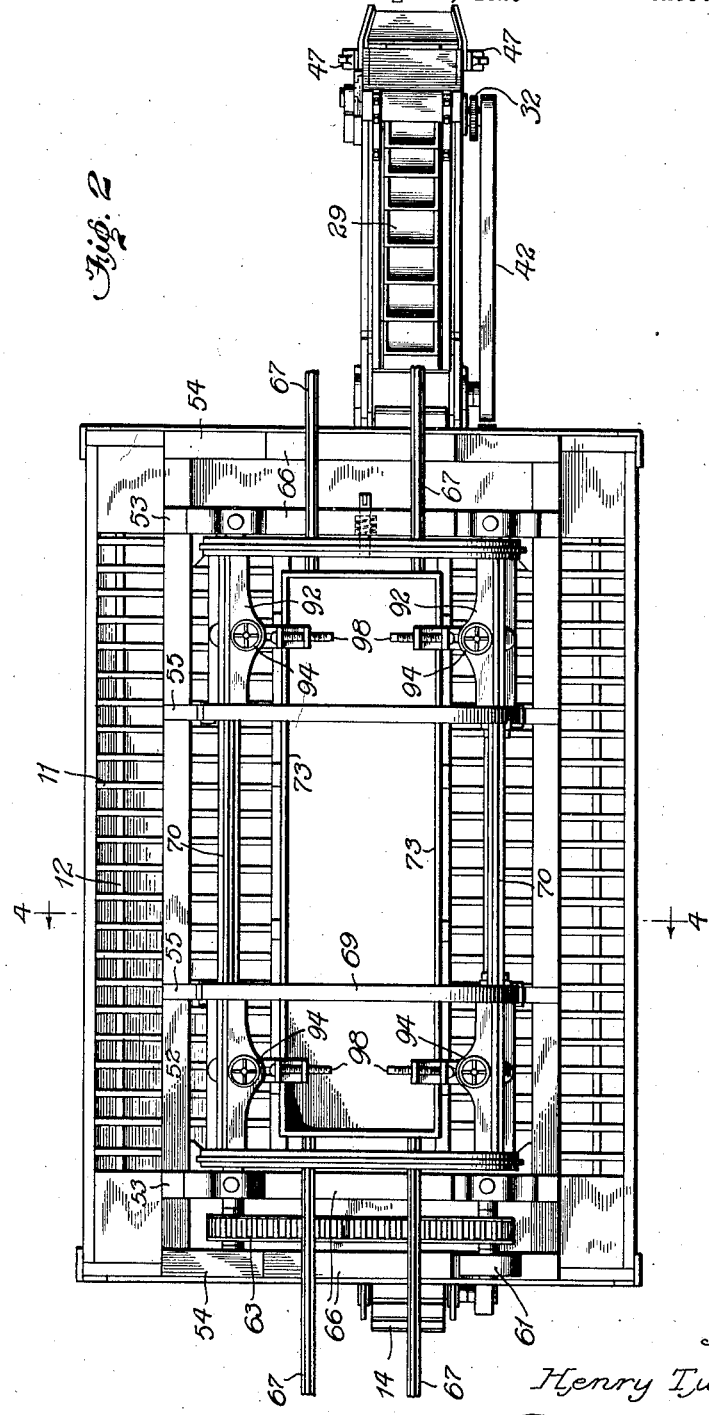
Inventor
Henry Turek
By
Attorney

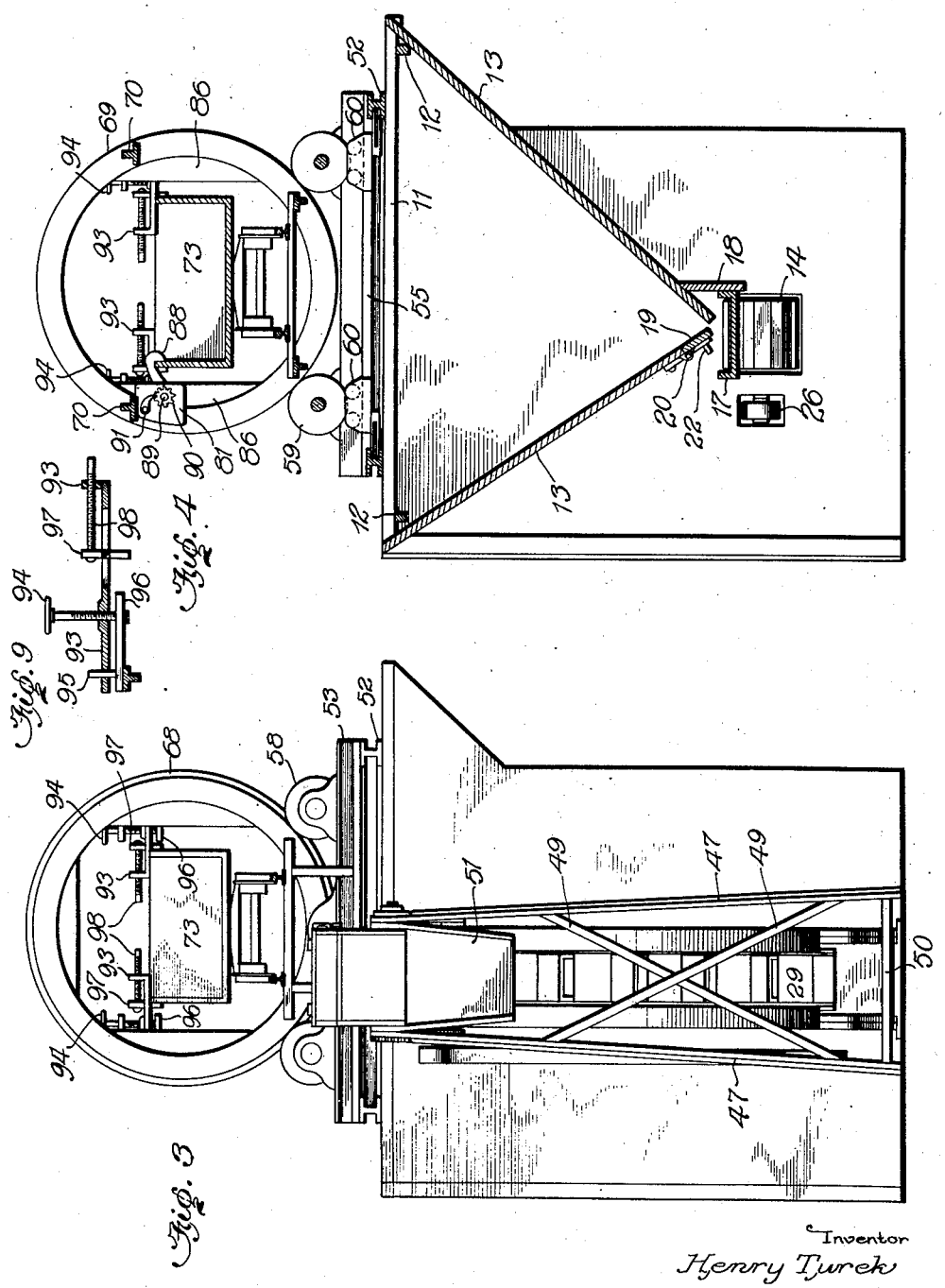

July 14, 1925.
H. TUREK
1,545,865
APPARATUS FOR UNLOADING CARS
Filed Aug. 11, 1923
4 Sheets-Sheet 4
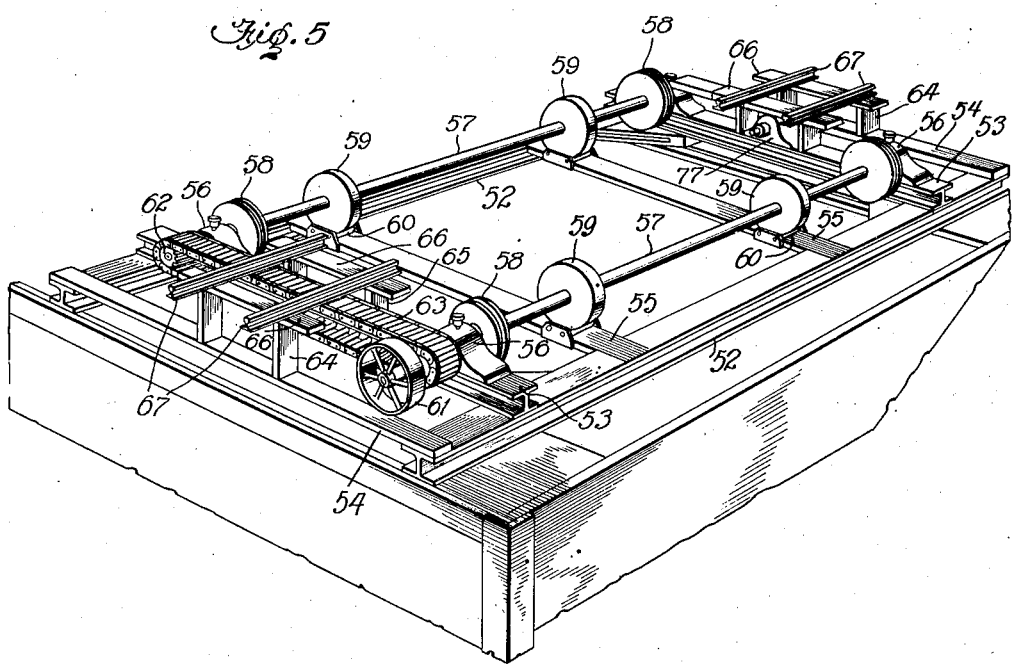
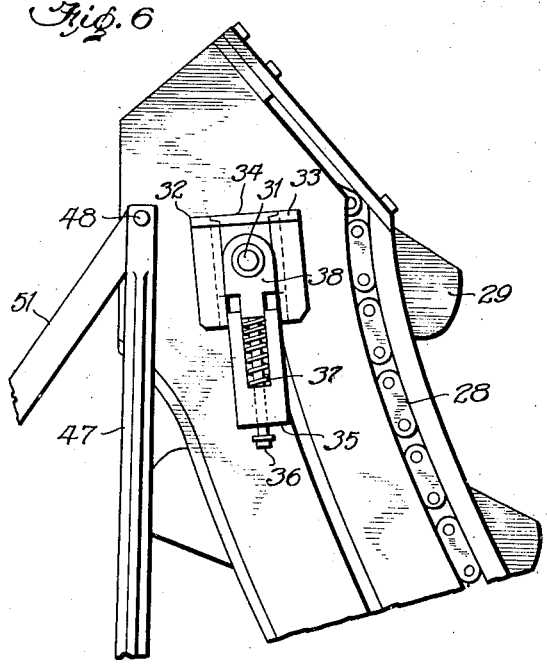
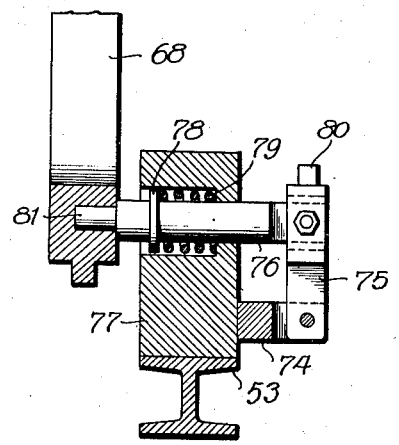
Inventor
Henry Turek Patented July 14, 1925.

1,545,865

UNITED STATES PATENT OFFICE.

HENRY TUREK, OF FLORENCE, NEBRASKA.

APPARATUS FOR UNLOADING CARS.

Application filed August 11, 1923. Serial No. 656,811.

*To all whom it may concern:*

Be it known that I, HENRY TUREK, a citizen of Czechoslovakia, residing at Florence, in the county of Douglas and State of Nebraska, have invented certain new and useful Improvements in Apparatus for Unloading Cars, of which the following is a specification.

My said invention relates to an unloading device for freight cars and it is an object of the invention to provide a device of this character which shall hold the car firmly and accurately in position and invert the same in a manner to dump the load into a chute leaving the car clean and empty.

A further object of the invention is to provide means for holding the rotary car-dumping cage with its tracks level and in alinement with the main tracks.

Another object of the invention is to provide a conveyor beneath the chute with means on the chute for ready removal of obstructions such as might stop the flow of material to the conveyor.

Another object of the invention is to provide an elevating conveyor cooperating with the first named conveyor for convenient loading of material on wagons or trucks.

Another object of the invention is to provide an improved safety device in connection with said elevating conveyor.

Still another object is to provide on the cage means for preventing movement of the car relatively thereto.

Referring to the accompanying drawings, which are made a part hereof and on which similar reference characters indicate similar parts, Figure 1 is a side elevation of my improved mechanism,

Figure 2, a plan,

Figure 3, an elevation looking from the righthand end of Figure 2,

Figure 4, a section on line 4—4 of Figure 2,

Figure 5, a perspective of the upper part of the structure with certain parts removed, Figure 6 a detail of the upper part of the elevating conveyor, Figure 7, a detail of a locking pin shown in Figure 2 with the cooperating parts in section, Figure 8, a detail of locking means for preventing movement of a car along the track, and Figure 9, a detail of means for securing the car to the track.

In the drawings reference character 10 indicates generally the fixed frame of the device having at its upper part a series of cross bars 11 held together by longitudinal bars 12 forming a grating to prevent entry of objects too large to pass readily through the remainder of the mechanism. Such mechanism comprises a pair of side members 13 forming with the end walls of the frame a chute to receive material passing through the grating. From this chute the material passes to a conveyor 14 preferably made up of an endless band on which are secured cross bars 15 each of which has a flap 16 which may or may not be flexible and which extends back over the link behind it in the sequence. The upper run of the conveyor extends through a trough 17 having a flat bottom and sides extending upward therefrom. This trough serves to support the intermediate part of the conveyor and prevents waste of material carried thereby. At one side the space between the trough and the adjacent chute member 13 is closed by a board or the like at 18. The other rim of the trough is further from the chute opening and the member 13 at this side is provided with a series of gates 19 hinged at 20 and provided with manually operable latches 21 from which project pins 22 forming handles for manipulation of the latches.

At its ends the conveyor 14 passes over rollers 23 having flattened faces to correspond to the flat under faces of the cross pieces 15 to secure positive driving action. These rollers are mounted on shafts 24 journaled in brackets at the ends of the frame and are driven in synchronism by a belt 26 passing over pulleys on the shafts 24. Preferably one of the shafts 24 is elongated and carries a second pulley to which connection is made from any convenient source of power but other driving means may be used as preferred or desirable.

At the end of the supporting frame corresponding to the discharge end of the conveyor 14 there is a curved frame 27 on which is an elevating conveyor consisting of an endless series of links 28, alternate ones of which are provided with buckets 29, while the intermediate links have cross pieces for bracing them. The elevating conveyor is an endless one and passes over rollers adjacent the ends of the casing 27, the shaft of one of said rollers extending out through the framework and carrying at its end a pulley 30 while the other roller has a shaft 31 carrying a gear 32. This shaft is supported by yieldable bearings, one of which is shown in detail in Figure 6 and comprises guides 33, a journal bearing 34 a fixed abutment 35 perforated for passage of a shaft 36 and apertured to provide a pocket for a spring 37 surrounding the shaft 36 which at its upper end is secured to a stirrup 38 pivotally connected to the bearing block 34 in any convenient manner and in this particular instance by embracing the shaft 31.

A fixed shaft 39 underneath the shaft 31 carries a gear 40 meshing with gear 32 and said shaft also bears a pulley 41. A belt 42 for driving the elevating conveyor extends over the pulleys 30 and 41. The adjacent shafts of the two conveyors may be connected by belt gearing or other gearing to drive one from the other, or they may be driven independently, if preferred. The sides of the casing 27 are slotted at 43 to afford access to the interior which is provided with a bar 44 having a curvature similar to that of the casing and similar also to the normal curvature of the conveyor in the curved casing. This bar has teeth 45 so arranged as quickly and effectively to catch the cross members of the links of the conveyor chain in case of backward movement of the chain due to a break at the upper end or in the lower run thereof, by which means piling up of the units of the chain at the bottom of the casing and injury to the casing and parts therein is mitigated. The slots 43 facilitate repair and replacement of parts of the casing in case of damage or accident. Guard rails 46 spaced from the upper edge of the casing are located so as to expose the links of the chain and extend closely alongside of the buckets 29 thus preventing possible sidewise movement and also providing access to the links for repairs and the like.

At its upper end the casing 27 is provided with a support consisting of uprights 47 hinged at 48 and provided with braces 49 and 50. A spout 51 is also pivoted at 48 for movement either with or independently of the support.

At the top of the framework 10 above the grating there is a pair of heavy I-beams 52 on which are supported similar beams 53 and a plurality of flat bars 54 and 55. The beams 53 carry bearings 56 in which are journaled parallel longitudinal shafts 57 and these shafts are provided with grooved rollers 58 and plain rollers 59 between them. The rollers 59 are supported by relatively small roller bearings 60 on the cross bars 55. At the left end of the front shaft 57 is a driving pulley 61 which is preferably driven from the same source of power as the conveyor belts heretofore described. At the left end of the rear shaft 57 is a sprocket 62 over which passes a sprocket chain 63 also passing over a similar sprocket on the front shaft and this sprocket gearing serves to drive the shafts in synchronism.

The cross bars 53 and 54 carry uprights 64 and 65 respectively on which are supported parallel upper cross beams 66. Rails 67 are secured to said cross beams, these rails matching with rails on a rotary dumping cage now to be described.

The cage is mounted on top of the framework 10, and is provided with annular grooved rails 68 adapted to rest on the grooved rollers 58 in a manner to prevent endwise movement of the cage, and with annular plain rails 69 resting on the plain rollers 59. These rollers are secured together by means of longitudinally extending bars 70, the lower pair of said bars providing supporting means for cross bars 71 on which are mounted rails 72 forming a track whose members match at their ends with the rails 67 thus providing convenient means by which a car 73 may be run into the cage preliminary to dumping.

For holding the cage securely in position with the rail ends matching I have provided means illustrated in Figure 7 comprising a bracket 74 on which is pivotally mounted an arm 75, said arm being again pivotally connected to a pin 76 slidably mounted in a block 77 fixed upon the right-hand I-beam 53. The pin has a collar 78 acted upon by a spring 79 to hold it normally forward and a projection 80 on the arm 75 may have secured thereto a cord or rope by means of which the reduced portion 81 of the pin may be withdrawn from its socket in the ring 68 when the cage is to be rotated, the spring 76 serving at other times to hold the cage locked in the position shown and also serving to automatically re-lock the cage at the proper point in its rotation. It will be understood that other locking means may be provided as desired.

On the cage alongside the rails at each end of the same I have provided bars 82 with longitudinal slots 83 in which are adjustably mounted pins or blocks 84 carrying hooks 85 for engagement respectively with the front and rear wheels of the car or with some corresponding part on the car to secure it against movement on the track lengthwise of the cage.

For further securing the car in place in the cage I have provided fins 86 inside the rings 69 at opposite sides thereof and have secured small blocks 87 to said fins at one side thereof. Pawls or hooks 88 are pivoted between the parts 86 and 87 on shafts 89 provided with ratchets 90 which are adapted to be engaged by pawls 91 to hold them against rotation after the locking members have been brought into engagement with the sides of a car as indicated in Figure 4.

The hooks 85 prevent longitudinal movement of the car and the hooks 88 prevent sidewise tilting. Co-acting with these I have provided brackets 92 between the rings 68 and 69 at each end of the cage and projecting over the side of the car from these brackets are horizontal arms 93 bent upward at their inner ends. Screws 94 in threaded engagement with these arms for moving them up and down according to the height of the car are rotatably secured to the brackets 92 or to extensions 96 of the said brackets to hold the arms in proper position relative to the car. Guiding pins 95 similarly located pass through holes in arms 93 to hold said arms in place. The arms 93 have longitudinal slots in which are mounted slidable blocks 97 for engagement with the sides of the car, the position of these blocks being determined by screws 98 threaded in the upward extensions of arms 93. It will be seen that these various holding means provide for holding the car against any movement relative to the cage.

In the operation of the device a loaded car will be run over the tracks into the position indicated on the cage and two hooks 85 will be positioned to hold it against movement along the track. The pawls or hooks 88, the arms 93 and the blocks 97 will all be located in the positions indicated in Figure 4 after which the means for driving the pulley 61 will be set in operation this pulley driving the front shaft 57 and through the sprocket gearing the rear shaft 57. The various rollers will act frictionally on the rings of the cage to revolve the cage and so to invert the cage and the car carried thereby with the result that the coal or other material carried by the car will fall out and pass through the grating at the top of the framework 10. The unloaded material will now pass down through the chute 13 and will gradually run through the lower opening of the chute, falling on the horizontal conveyor which carries it to the elevating conveyor where the buckets will receive the material and dump it on the chute 51. Any preferred form of transporting device such as wagons, trucks or railway cars may be positioned beneath the chute 51 to receive the successive loads from the buckets of the conveyor.

It will be evident to those skilled in the art that my device may be modified in many respects without departing from the spirit of the invention, and therefore I do not limit myself to the specific embodiment of the invention shown in the drawings and described in the specification, but only as indicated in the appended claims.

Having thus fully described my said invention, what I claim as new and desire to secure by Letters Patent, is:

1. In a car unloading apparatus, a cage, a track on the cage for supporting a car, a longitudinally adjustable and substantially vertically disposed pivot mounted on said cage adjacent said track and a blocking element on said pivot for engagement with a wheel to prevent movement of the car along the track in a given direction, substantially as set forth.

2. In a car unloading apparatus, a tiltable cage, means on the cage for supporting a car, and means for holding the car in position, said means comprising a bracket movable downwardly against the body of the car to hold the car on its support said bracket having a transversely movable clamping element mounted thereon adapted to be moved into engagement with the car to prevent sidewise movement thereof, substantially as set forth.

3. In a car unloading apparatus, a tiltable cage, means on the cage for supporting a car, and means for holding the car in position, said means comprising a frame lowerable into engagement with the car and having slots disposed transversely of the car and clamping elements extending through and longitudinally adjustable in said slots, substantially as set forth.

4. In a car unloading apparatus, a rotatable cage, tracks on the cage for supporting a car, and pivoted hooks on the cage adapted to engage the wheels of the car to prevent movement thereof along said tracks said hooks being adjustable lengthwise of the cage for holding cars of different lengths, substantially as set forth.

5. In a car unloading apparatus, a rotatable cage, tracks on the cage for supporting a car, hooks pivoted on the cage engageable over the sides of the car, ratchets fixed to said hooks, and pawls cooperating with the ratchets to prevent accidental disengagement of the hooks, substantially as set forth.

6. In a car unloading apparatus, a cage, means on the cage for supporting a car, a hook for engagement over the side of the car and a clamp for holding the side of the car against said hook, substantially as set forth.

7. In a car unloading apparatus, a cage, means on the cage for supporting a car, a frame at each side of the car lowerable into engagement with the upper edge of the sides of the car, an adjustable clamping element carried by each of said frames and movable inwardly into engagement with the side of the car, and a hook at one side of the car engageable over a side of the car for holding the car down on its support and for holding the side of the car against one of said clamping elements, substantially as set forth.

8. In a car unloading apparatus, a rotatable cage, tracks on the cage for supporting a car, adjustable brackets for engaging the upper edges of the car to hold it down on the tracks as the car rotates, and adjustable means carried by said brackets for engagement with the sides of the car to prevent tilting, substantially as set forth.

9. In a car unloading apparatus, a rotatable cage, tracks on the cage for supporting a car, adjustable brackets for engaging the upper edges of the car to hold it down on the tracks as the car rotates said brackets having horizontal slots, blocks mounted in said slots, and means for moving the blocks into engagement with the sides of the car, substantially as set forth.

In witness whereof, I have hereunto set my hand and seal at Florence, Nebraska, this 26th day of July, A. D. nineteen hundred and twenty-three.

HENRY TUREK. [L. S.]

Witnesses:
 JULIUS J. ZITNIK,
 JOSEPH A. POLAN.